United States Patent [19]

Shimp

[11] Patent Number: 4,709,008
[45] Date of Patent: Nov. 24, 1987

[54] BLEND OF TRIS (CYANATOPHENYL) ALKANE AND BIS(CYANATOPHENYL) ALKANE

[75] Inventor: David A. Shimp, Prospect, Ky.

[73] Assignee: Interez, Inc., Louisville, Ky.

[21] Appl. No.: 880,529

[22] Filed: Jun. 30, 1986

[51] Int. Cl.$^4$ .............................................. C08G 83/00
[52] U.S. Cl. .................................. 528/422; 528/210; 528/211
[58] Field of Search ....................... 528/422, 210, 211

[56] References Cited

U.S. PATENT DOCUMENTS

| | | | |
|---|---|---|---|
| 3,403,128 | 8/1966 | Berndt | 260/45.8 |
| 3,448,079 | 5/1966 | Grigat | 260/59 |
| 3,755,402 | 6/1970 | Grigat | 260/453 |
| 3,987,230 | 3/1975 | Gaku | 428/236 |
| 3,994,949 | 9/1975 | Meyer | 260/453 |
| 4,022,755 | 7/1975 | Tanigaichi | 260/59 |
| 4,330,658 | 12/1980 | Ikeguchi | 528/73 |
| 4,581,425 | 4/1985 | Hefner | 526/72 |

*Primary Examiner*—Harold D. Anderson
*Attorney, Agent, or Firm*—Herbert P. Price

[57] ABSTRACT

Blends of tricyanate esters and dicyanate esters when cured exhibit excellent heat and moisture resistant properties. The cured compositions are useful in structural composites, filmed structural adhesive and printed wiring boards.

14 Claims, No Drawings

BLEND OF TRIS (CYANATOPHENYL) ALKANE AND BIS(CYANATOPHENYL) ALKANE

BACKGROUND OF THE INVENTION

The field of art to which this invention pertains is aryl cyanate esters, i.e., cyanic acid esters of polyhydric phenols.

Industry is constantly searching for lighter, stronger and more resistant materials to be used in place of the materials used today. For example, the aerospace industry is devoting considerable effort to utilizing structural composites in place of metals. Structural composites based on thermoplastic or thermoset resins and glass or carbon fibers have been and are being used successfully in many parts of military and commercial aircraft. Thermoset resins which are being used in such applications are epoxy resins, bismaleimide resins, and cyanate ester resins.

Cyanate ester resins, which are finding more and more uses, are based on the reaction products of polyhydric phenols and cyanogen halides. Such resins and their methods of preparation are described in U.S. Pat. Nos. 3,403,128 and 3,755,402. Additional patents which describe cyanate esters are U.S. Pat. Nos. 3,448,079, 3,987,230, 3,994,949, 4,022,755, and 4,330,658. Tris(cyanatophenyl)alkanes are described in U.S. Pat. No. 4,581,425. Even though these cyanate esters have exceptional properties when cured, there is a need for materials which have even better heat resistant properties and strength properties under adverse conditions.

Therefore, there is a continuing effort to find materials which have even higher heat resistance, moisture resistance, and strength properties.

SUMMARY OF THE INVENTION

This invention relates to blends of cyanate esters. In one aspect, this invention pertains to blends of cyanate esters based on trihydric phenols with cyanate esters based on dihydric phenols. In still another aspect, this invention relates to prepolymers of the cyanate ester blends and to thermoset polymers obtained therefrom.

The tricyanate esters used in this invention are tris(cyanatophenyl)alkanes having the structural formula:

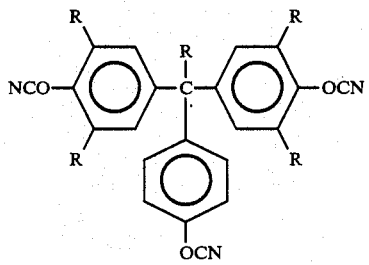

wherein the R's are H or methyl and can be the same or different. These tri cyanate esters are blended with dicyanate esters having the structural formula:

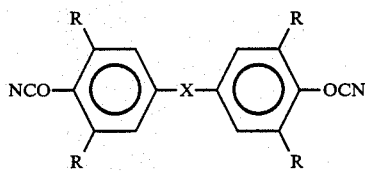

wherein the R's are H or methyl and can be the same or different and wherein X is methylene, alkylidene having 2 to 4 carbon atoms, oxygen (—O—), or divalent sulfur (—S—). When properly cured, the blended resins produce thermoset plastics which, when tested in the moisture saturated condition, have heat distortion temperatures of at least 230° C., moisture absorptions of no more than 3 percent, and flexure modulus of at least $0.4 \times 10^6$ psi at 75° F., and of at least $0.2 \times 10^6$ psi at 325° F.

The compositions of this invention find uses in the following areas:

a. Structural composites for military aircraft, particularly supersonic, and commercial aircraft, particularly in the engine area;

b. Structural film adhesive for military and commercial aircraft;

c. Filament winding or vacuum bag autoclave molding processes;

d. Tooling for structural composites;

e. Multilayer printed wiring boards;

f. Semi conductor encapsulants.

DETAILED DESCRIPTION OF INVENTION

The tricyanate esters useful in this invention are made by reacting a cyanogen halide with tris(hydroxyphenyl)alkanes. The tris(hydroxyphenyl)alkanes have the formula:

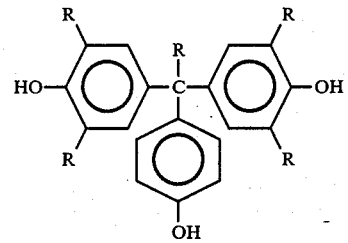

wherein the R's have the same designation as indicated herein above.

Such trihydric phenolic compounds are made by reacting 4-hydroxybenzaldehyde or 4-hydroxyacetophenone with an excess of phenol under acidic conditions. Such trihydric phenols are disclosed in U.S. Pat. Nos. 3,579,542 and 4,394,496 which are hereby incorporated by reference.

In order to prepare the tris cyanate ester useful in this invention, the trihydric phenols are reacted with a cyanogen halide in the presence of an acid acceptor, i.e., a base. This reaction is well known and is described in U.S. Pat. No. 3,755,402 which is hereby incorporated by reference. The cyanogen halides useful in this invention are cyanogen chloride and cyanogen bromide, with cyanogen chloride being preferred.

The acid acceptors which can be used to prepared the tris cyanate esters useful in this invention are inorganic or organic bases such as sodium hydroxide, potassium hydroxide, sodium methylate, potassium methylate, and various amines, preferably tertiary amines. Examples of useful amines are triethylamine, tripropylamine, diethylpropylamine, pyridine, and the like. A preferred base is triethylamine.

The reaction is carried out in an organic solvent such as ethyl acetate, toluene, xylene, chlorinated hydrocarbons, acetone, diethyl ketone and the like. A preferred solvent is methylene chloride.

The reaction is conducted under low temperatures, preferably between about −30° C. and 15° C.

The dicyanate esters useful in this invention are made by reacting dihydric phenols with cyanogen halide using the procedure described in U.S. Pat. No. 3,579,542 referred to hereinabove. Useful dihydric phenols are bis(4-hydroxyphenyl)methane, bis(4-hydroxyphenyl)-2,2-propane (Bisphenol A), bis(4-hydroxy-3,5-dimethylphenyl)methane, bis(4-hydroxy-3,5-dimethylphenyl)-2,2-propane, bis(4-hydroxyphenyl)ether and bis(4-hydroxyphenyl)sulfide.

The compositions of this invention are made by blending the tricyanate ester and the dicyanate esters in the amounts of about 90 to about 10 parts by weight of tricyanate ester with about 10 to about 90 parts by weight of dicyanate ester. Preferred blends are made from 60 to about 20 parts by weight of tricyanate ester with about 40 to about 80 parts by weight of dicyanate ester.

The blends of tricyanate esters and dicyanate esters can be used as is or can be partially trimerized to form prepolymers. Prepolymers are amorphous in form and are somewhat easier to use in prepregging operations then the crystalline or semi-crystalline unpolymerized blends. Prepolymers are made by heating the blends with or without catalyst at a temperature of about 140° C. to about 220° C. for a time sufficient to cyclotrimerize from about 5 to about 50 percent of the cyanate functional groups. Useful prepolymers possesses melt viscosities ranging from about 2,000 cps. at 50° C. up to 10,000 cps. measured at 150° C. Catalysts which can be used in preparing the prepolymers are mineral or Lewis acids, bases such as alkali metal hydroxides, alkali metal alcoholates or tertiary amines, salts such as sodium carbonate or lithium chloride, or active hydrogen containing compounds, such as bisphenols and monophenols. It is preferred to conduct the prepolymerization reaction without a catalyst, utilizing only heat followed by thermal quenching, in the manner taught by British Pat. No. 1,305,762 which is hereby incorporated by reference.

The compositions of this invention in either unpolymerized or prepolymer form can be cured by heat alone but are preferably cured by the use of a catalyst plus heat. Such curing catalysts include those described above which can be used in preparing prepolymers. Additional catalyst are those described in U.S. Pat. Nos. 3,962,184, 3,694,410 and 4,026,213 which are hereby incorporated by reference. Examples of such catalyst include zinc octoate, tin octoate, zinc stearate, tin stearate, copper acetylacetonate, phenol, catechol, triethylenediamine and chelates of iron, cobalt, zinc, copper, manganese and titanium with bidentate liquids such as catechol. Such catalysts are used in the amounts of about 0.001 to about 20 parts by weight per 100 parts of the cyanate ester blend. A preferred catalyst system is that described in my copending patent application, Ser. No. 789,678 filed Oct. 21, 1985. Such catalysts are liquid solutions of a metal carboxylate and an alkylphenol, e.g., zinc napththenate and nonyl phenol. These catalysts are used in the amounts of about 0.001 to about 0.5 part by weight of metal and about 1 to about 20 parts by weight of alkylphenol per 100 parts by weight of cyanate ester blend.

The compositions of this invention are cured by heating at elevated temperatures for a time sufficient to obtain a complete cure, i.e., until at least about 80 percent of the cyanate functional groups are cyclotrimerized. The curing reaction can be conducted at one temperature or can be conducted by heating in steps. If conducted at one temperature, the temperature will vary from about 250° F. to about 450° F. When conducted by stepwise heating, the first step, or gelation step is performed at a temperature of about 150° F. to about 350° F. The curing step is conducted at a temperature of about 300° F. to about 450° F., and the optional post-curing step is conducted at a temperature of about 400° F. to about 550° F. The overall curing reaction will take about 5 minutes to about 8 hours.

The tricyanate-ester dicyanate-ester blends of this invention have very good properties when cured. Surprisingly, it has been found that the cured blends of the tricyanate esters and dicyanate esters have properties which exceed the properties of either of the esters when cured alone.

The tricyanate-dicyanate ester blends of this invention can be blended with polyepoxide resins and can be cured to form useful thermoset compositions. Up to about 70 weight percent based on total blend weight can be polyepoxide resin. Such polyepoxide resins are the well-known glycidyl ethers of polyhydric phenols which are made by reacting an epihalohydrin, preferably epichlorohydrin, with a polyhydric phenol, preferably bisphenol A.

When formulating for particular end uses, additional components can be incorporated in the polycyanate compositions. Such components include minor amounts of thermoplastic resin tougheners, reinforcing fibers, colloidal silica flow modifiers, mineral fillers and pigments.

The cured compositions of this invention can be used in vacuum bagged structural composites, transfer molded encapsulants, filmed structural adhesives, printed wiring boards and composites for aircraft primary structures.

The following examples will describe the invention in more detail. Parts and percentages unless otherwise indicated are parts and percentages by weight.

EXAMPLE 1

Synthesis of tris(4-hydroxyphenyl)-1,1,1 ethane

To a suitable reactor were added 2900 parts of phenol and 450 parts of 4-hydroxyacetophenone. Thioglycolic acid in the amount of 53 parts was then added. After thorough mixing, hydrogen chloride gas was bubbled through the reactants with the temperature at 32° C. for about 4.5 hours with the temperature rising to 42° C. The reactants were then heated at 40° C. to 50° C. for 14 hours and were then neutralized with aqueous sodium carbonate. The reaction product was then extracted with ethyl acetate/water mixtures. After several extractions, the organic solvent extracts were combined and the volatiles were removed using a rotating vacuum evaporator. The solid material was dissolved in methanol and was treated with charcoal for decolorization. The product was then precipitated with water resulting in a tan orange powder which was vacuum dried. The resulting product had a melting point of 243° C.

EXAMPLE 2

Synthesis of tris(4-cyanatophenyl)-1,1,1,-ethane

To a suitable reactor were added 900 parts of methylene chloride. Cyanogen chloride, 164 parts, was then added by means of a sparge over a 1 hour period while keeping the temperature between 1.2° and 7° C. With the temperature at 2.5° C., a solution of 264.9 parts of tris(4-hydroxyphenyl)-1,1,1 ethane in 340 parts of acetone was added over a 11 minute period with the temperature rising to 8.2° C. The temperature was then lowered to −10° C. and 264.1 parts of triethylamine were then added over a period of 42 minutes with the temperature being held at −10° C. throughout the addition. The reaction product was then washed with 1,000 parts of water. The washing was repeated 3 more times. When the washing was completed, the product was vacuum distilled to remove the methylene chloride to a concentration of 65 percent nonvolatiles. The resulting solution was placed in a refrigerator overnight. A crystalline product, 192.5 parts, was recovered from the methylene chloride solution. The dried product was an off-white crystalline material melting at 104° C. (capillary method) and absorbing strongly at 2270 cm$^{-1}$ wave number (characteristic of cyanate functionality).

EXAMPLE 3

Synthesis of bis(3,5-dimethyl-4-hydroxyphenyl), 4-hydroxyphenyl-1,1,1,-ethane and its tricyanate ester Using the same procedure described in Example 1, 610 parts of 2,6-dimethylphenol, 280 parts of 4-hydroxy acetophenone and 25 parts of thioglycolic acid were reacted using a hydrogen chloride gas sparge to form the trihydric phenol.

Using the same procedure described in Example 2, a solution was prepared from 700 parts of methylene chloride and 123.3 parts of cyanogen chloride. To this solution was added a solution of 242.14 parts of the trihydric phenol described above, dissolved in 250 parts of acetone. The resulting solution was then reacted with 196.6 parts with triethylamine producing 277.8 parts of tricyanate ester. The product was an amorphous viscous liquid of brown color.

EXAMPLE 4

The tricyanate esters described in Example 2 and Example 3 were mixed with dicyanate esters, namely bis(4-cyanatophenyl)-2,2-propane (referred to as BADCy) and bis(3,5-dimethyl-4-cyanatophenyl)methane (referred to as METHYLCy) and were heated to about 200° to about 250° F. to form blends. Catalyst solutions, blends of nonyl phenol and zinc napththenate, were then dissolved in the molten cyanate esters. After vacuum deairing, the catalyzed cyanate ester blends were poured into aluminum sheet molds preheated at 220° F. The molds were then heated to gel and cure the cyanate esters. Optically clear castings, ⅛ inch thick were sawed and milled into test bars which were subjected to physical testing. The amounts of each of the components used to make the cured castings, the cure schedules and the results of the tests are listed in the following tables.

TABLE 1

|  | A | B | C |
|---|---|---|---|
| Material |  |  |  |
| Example 2 | 105 | 70 | 80 |
| BADCy | 35 | 70 |  |
| Nonyl Phenol | 2.38 | 2.38 | 1.36 |
| Zn Naphthenate, 8% Zn | 0.0168 | 0.0168 | 0.0096 |
| Add catalyst blend at 90° C. |  |  |  |
| Cure 1 hour at 350° F., 1 hour at 420° F., and 2 hours at 482° F. |  |  |  |
| Properties |  |  |  |
| Gel Time at 250° F. | Overnight → |  |  |
| HDT °C. Dry | 193 | >255 | 247 |
| Wet[1] | 176 | >255 | 254 |
| % H$_2$O Absorption[1] | 1.37 | 1.84 | 1.87 |
| Tensile Strength, psi | 9750 | 6883 |  |
| Tensile Strain at break % | 2.0 | 1.4 |  |
| Tensile Modulus, 10$^6$ psi | 0.52 | 0.52 |  |
| Flexure Strength, psi | 19873 | 17036 | 12314 |
| Flexure Strain at break % | 3.77 | 3.26 | 2.36 |
| Flexure Modulus, 10$^6$ psi | 0.54 | 0.53 | 0.53 |
| MeCl$_2$ Absorption |  |  |  |
| 1 hr. | 0.41 | 0.15 | 0.18 |
| 3 hrs. | 1.33 | 0.26 | 0.40 |
| 6 hrs. | 5.03 | 0.56 | 0.95 |
| 23 hrs. | 22.06 | 1.86 | 4.47 |
| 48 hrs. |  | 4.55 | 11.51 |
| 72 hrs. |  | 7.27 | 18.86 |
| 192 hrs. |  | 25.14 |  |

[1]Moisture conditioned 64 hours at 200° F. and >95 percent RH

TABLE 2

|  | A | B | C | D | E | F | G |
|---|---|---|---|---|---|---|---|
| Material |  |  |  |  |  |  |  |
| Example 2 | 49 | 70 | 91 | 70 | 48 |  |  |
| BADCy | 91 | 70 | 49 |  |  |  | 160 |
| METHYLCy |  |  |  | 70 | 112 | 160 |  |
| Nonyl Phenol | 2.38 | 2.38 | 2.38 | 2.38 | 2.38 | 3.2 | 3.2 |
| Zn Napthenate, 8% Zn | 0.14 | 0.14 | 0.10 | 0.14 | 0.2 | 0.30 | 0.2 |
| Cure 1 hrs at 350° F., 1 hrs at 420° F. and 2 hrs at 482° F. |  |  |  |  |  |  |  |
| Properties |  |  |  |  |  |  |  |
| Gel Time at 250° F. min | 15 | 10 | 12 | 45 | 165 | 25 | 15 |
| HDT, °C. |  |  |  |  |  |  |  |
| Dry | >258 | >258 | >258 | >258 | 252 | 210 | 240 |
| Wet | 204 | 204 | 211 | 260 | 255 | 204 | 200 |
| % H$_2$O Absorption | 2.36 | 2.71 | 2.69 | 1.78 | 1.49 | 1.03 | 1.7 |
| Flexure Strength, psi at R.T. | 12136 | 11,251 | 11,807 | 9,714 | 16,630 | 23,300 | 25,500 |
| Flexure Strain at break % psi at R.T. | 3.02 | 2.77 | 2.69 | 2.32 | 3.64 | 8.2 | 9.5 |
| Flexure Modulus, 10$^6$ psi at R.T. | 0.42 | 0.41 | 0.44 | 0.40 | 0.46 | 0.45 | 0.46 |
| Flexure Strength, psi at 325° F. | 12,380 | 11,901 | 8,802 | 10,511 | 10,837 | 9,500 | 15,000 |
| Flexure Strain at break % at 325° F. | 4.60 | 4.40 | 2.92 | 4.08 | 3.28 | 8.2 | 6.5 |
| Flexure Modulus, 10$^6$ psi at | 0.31 | 0.30 | 0.30 | 0.29 | 0.34 | 0.34 | 0.37 |

TABLE 2-continued

|  | A | B | C | D | E | F | G |
|---|---|---|---|---|---|---|---|
| 325° F. |  |  |  |  |  |  |  |
| Flexure Strength at 325° F. Wet | 10,354 | 8997 | 8,140 | 8874 | 11,161 | 8000 | 7900 |
| Flexure Strain at 325° F. Wet | 7.00 | 5.97 | 4.46 | 4.34 | 4.29 | >12 | >12 |
| Flexure Modulus at 325° F. Wet | 0.24 | 0.20 | 0.21 | 0.24 | 0.30 | 0.275 | 0.185 |

TABLE 3

|  | A | B |
|---|---|---|
| Material |  |  |
| Example 3 | 80 | 80 |
| BADCy | 80 |  |
| METHYLCy |  | 80 |
| Nonyl Phenol | 3.2 | 3.2 |
| Zn Napthenate, 8% Zn | 0.15 | 0.20 |
| Cure 1 hour at 350° F., 1 hour at 420° F. and 2 hours at 482° F. |  |  |
| Properties |  |  |
| HDT °C. Dry | >255 | 255 |
| Wet | 203 | 235 |
| % H$_2$O Absorption | 1.75 | 1.47 |
| Flexure Strength at R.T. | 21765 | 12076 |
| Flexure Strain at break % at R.T. | 4.83 | 2.51 |
| Flexure Modulus, 10$^6$ psi at R.T. | 0.49 | 0.48 |
| Flexure Strength, psi at 325° F. | 15,668 | 13,300 |
| Flexure Strain at break % at 325° F. | 4.36 | 4.12 |
| Flexure Modulus, 10$^6$ psi at 325° F. | 0.40 | 0.36 |
| Flexure Strength, psi at 325° F. Wet | 9,650 | 11,300 |
| Flexure Strain at break % 325° F. Wet | 11.5 | 7.2 |
| Flexure Modulus, 10$^6$ psi at 325° F. Wet | 0.20 | 0.26 |

EXAMPLE 5

Preparation of a co-prepolymer by partially cyclotrimerizing a blend of tricyanate and dicyanate esters Sixty parts of the tricyanate described in Example 2 and 140 parts of bis(3,5-dimethyl-4-cyanatophenyl)methane were sparged with nitrogen gas in a glass 3-neck flask, heated to 195° C. to 206° C., and held at this temperature with mechanical agitation for a period of 277 minutes. When initially melted, the refractive index of the monomer blend, measured at 110° C., was 1.5390. During the heating period at 195°–206° C., the refractive index progressively advanced to 1.5547, and a sample cooled to room temperature changed from a crystalline mixture to an amorphous, tacky semisolid. These changes indicated partial cyclotrimerization of cyanate functionality. When the refractive index reaches 1.5547, the molten prepolymer was poured into a tray to cool. At room temperature this product was a dark amber, tacky, semisolid resin of refractive index at 110° C. of 1.5546, weight/gallon of 9.91 lbs., and melt viscosity of 2,175 cps at 82° C.

The co-prepolymer can be dissolved in a solvent, such as methyl ethyl ketone, and can be used in prepregging operations to make structural composites.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed:

1. A curable composition consisting essentially of a blend of a tricyanate ester and a dicyanate ester in the amounts of about 90 to about 10 parts by weight of the tricyanate ester and about 10 to about 90 parts of the dicyanate ester, the total being 100 parts wherein the tricyanate ester has the structural formula:

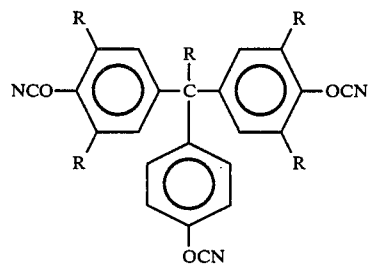

and the dicyanate ester has the structural formula:

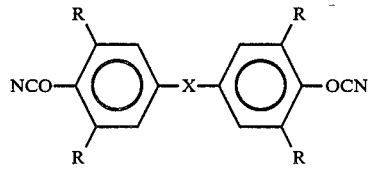

wherein each R is H or methyl and is the same or different and wherein X is methylene, alkylidene having 2 to 4 carbon atoms, oxygen (—O—), or divalent sulfur (—S—).

2. The composition of claim 1 wherein the blend contains about 20 to about 60 parts by weight of tricyanate ester and about 80 to about 40 parts by weight of dicyanate ester.

3. The composition of claim 1 wherein the tricyanate ester is tris(4-cyanatophenyl)-1,1,1-ethane.

4. The composition of claim 1 wherein the tricyanate ester is bis(3,5-dimethyl-4-cyanatophenyl),-4-cyanatophenyl-1,1,1-ethane.

5. The composition of claim 1 wherein the dicyanate ester is bis(4-cyanatophenyl)-2,2-propane.

6. The composition of claim 1 wherein the dicyanate ester is bis(3,5-dimethyl-4-cyanatophenyl)methane.

7. A prepolymer of the composition of claim 1 wherein about 5 percent to about 50 percent of the cyanate functional groups are cyclotrimerized.

8. A prepolymer of the composition of claim 2 wherein about 5 percent to about 50 percent of the cyanate functional groups are cyclotrimerized.

9. A prepolymer of the composition of claim 3 wherein about 5 percent to about 50 percent of the cyanate functional groups are cyclotrimerized.

10. A prepolymer of the composition of claim 4 wherein about 5 percent to about 50 percent of the cyanate functional groups are cyclotrimerized.

11. A prepolymer of the composition of claim 5 wherein about 5 percent to about 50 percent of the cyanate functional groups are cyclotrimerized.

12. A prepolymer of the composition of claim 6 wherein about 5 percent to about 50 percent of the cyanate functional groups are cyclotrimerized.

13. A cured composition obtained by heating the composition of claims 1, 2, 3, 4, 5 or 6 at a temperature of about 250° F. to about 550° F. until at least 80 percent of the cyanate functionality has been cyclotrimerized.

14. A cured composition obtained by heating the prepolymer of claims 7, 8, 9, 10, 11, or 12 at a temperature of about 250° F. to about 550° F. until at least 80 percent of the cyanate functionality has been cyclotrimerized.

* * * * *